United States Patent Office 3,320,095
Patented May 16, 1967

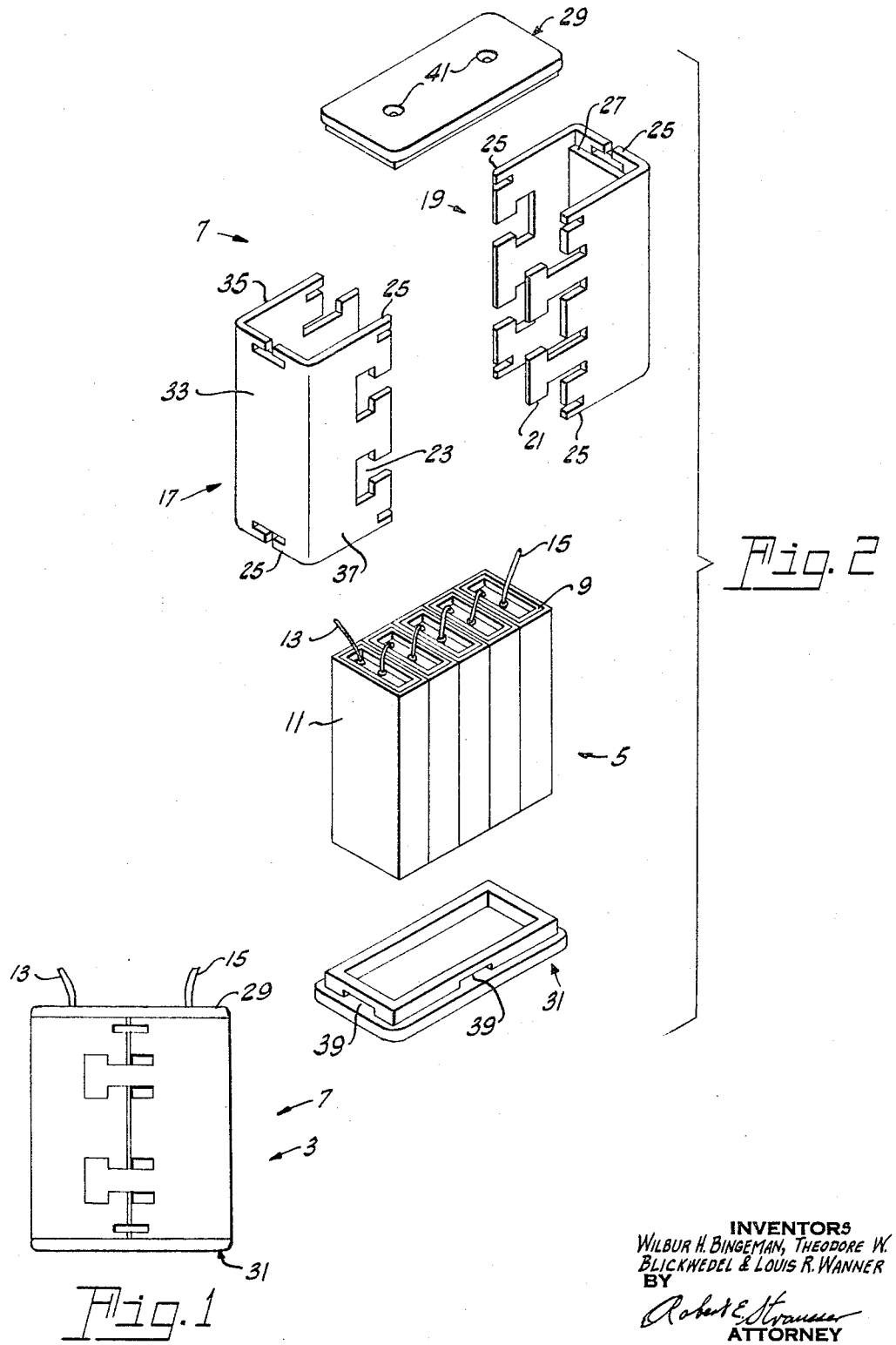

3,320,095
MULTIPLE CELL CONTAINER
Wilbur H. Bingeman, Theodore W. Blickwedel, and Louis R. Wanner, Emporium, Pa., assignors to Sylvania Electric Products Inc., a corporation of Delaware
Filed Dec. 28, 1964, Ser. No. 421,480
6 Claims. (Cl. 136—166)

This invention relates to batteries and more particularly to an improved container for a plurality of individual battery cells.

As is well known in the art, it is a common practice to include a plurality of individual cells within a container and to electrically connect the individual cells to each other and to a pair of terminals to provide a battery having either a voltage or capacity rating which is greater than the rating of any one of the individual cells. Moreover, the ever-increasing demand for batteries of the rechargeable type which utilize sealed or nonvented individual cells and the problems inherent to such cells are added inducements for an improved container for the individual cells.

Regarding the sealed type of storage cell, it is well known that such cells include opposite-polarity electrodes with a separator therebetween and a so-called "starved" electrolyte. It is also well known that deformation of the electrodes results in not only a reduction in capacity but also an undesirable increase in gas pressure within the cell. Moreover, this deterioration process is cumulative with the result that the configuration of the individual cells becomes increasingly distorted until either the cell walls or cell capacity is deleteriously affected.

Although numerous containers and techniques have been utilized to overcome the above-mentioned undesired conditions, all of the known techniques and containers appear to have inherent characteristics which leave much to be desired. For example, one known method is to surround each individual cell with an insulating layer, arrange the cells in a stack, place an insulating plate at each end of the stack, wrap the insulating plates and stacked cells with a metal strip, and weld the strip together to provide a container.

While batteries having a container fabricated in accordance with the above technique have provided reasonably satisfactory results, it has been found that such a process is slow, costly, and ill-adapted to an automated process. Further, the metal strip must be sufficiently deformable to permit a wrapping process. Moreover, utilization of a readily deformable material to contain a plurality of cells is diametrically opposed to the desire to restrain the cells from deformation due to internal gas pressures therein. Also, even though the metal strip provides a container for a plurality of cells, there is no battery terminal means provided for convenient external electrical attachment thereto.

Therefore, it is an object of this invention to provide an improved container for a plurality of individual battery cells.

Another object of the invention is to provide an improved battery container which surrounds and compressively restrains a plurality of individual cells.

Still another object of the invention is to provide an improved container for economically assembling a plurality of individual cells to provide a multicell battery.

A further object of the invention is to provide a novel and improved container especially applicable to the automated assembly of a plurality of individual cells to provide a multicell battery.

A still further object of the invention is to provide an improved container for a plurality of individual cells which is manufacturable to normal dimensional tolerances and also compressively restrains the cells.

An additional object of the invention is to provide an improved container for a plurality of individual cells which includes an enhanced means for external electrical connection to the cells.

These and other objects are achieved in one aspect of the invention by a container which includes a pair of half-sections having male and female portions which are joined in interlocking engagement to provide an open-ended enclosure compressively holding a plurality of electrically insulated individual cells.

For a better understanding of the present invention, together with other and further objects, advantages, and capabilities thereof, reference is made to the following disclosure and appended claims in connection with the accompanying drawings in which:

FIG. 1 is an elevational view of one embodiment of a battery in accordance with the invention; and FIG. 2 is an exploded isometric view of the parts of the battery of FIG. 1.

Generally, a battery includes a plurality of electrically interconnected individual cells within a container and a pair of terminals for convenient external electrical connection to electrodes of opposing polarity within the battery. The individual cells may be round, rectangular, or any one of a number of well-known shapes which, upon stacking, provide a specific configuration to be surrounded by the container. Further, the individual cells may be sealed cells, vented cells, or other types of cells utilized in battery fabrication.

More specifically, FIGS. 1 and 2 illustrate one embodiment of a battery 3 which includes a plurality of substantially rectangular-shaped nonvented cells 5 surrounded and compressively held by a substantially rectangular-shaped container 7. In the well-known manner, each of the individual cells 5 has a positive and a negative electrode and the negative electrode is usually, not necessarily, connected electrically to the outer metal surface 9 of the cell 5 while the positive electrode is electrically insulated from the outer metal surface 9.

In the process of assembling the individual cells 5 into a multicell battery 3, a common technique is to surround each of the cells 5 with an electrically nonconductive layer 11 of a material such as cellophane for example. Then, the individual cells 5 are connected in series by attaching the positive electrode of each of the cells 5 to the negative electrode of the adjacent cell 5. The negative electrode of one of the cells 5 remains unattached to provide a negative battery terminal 13 and the positive electrodes of one of the cells 5 remains free to provide a positive battery terminal 15.

The container 7 includes a pair of half-sections 17 and 19 having male portions 21, female portions 23, and tongue portions 25. Preferably, not necessarily, associated with the container 7 is at least one resilient insulating layer 27 and a pair of end members 29 and 31.

The half-sections 17 and 19 include at least one male portion 21 and one female portion 23 in order to permit the assembly thereof into a container 7 having an interlocking engagement of the male and female portions 21 and 23, respectively.

Also, the half-sections 17 and 19 are preferably hermaphroditic in form whereby 180° rotation of one-half section 17 with respect to the other half-section 19 provides alignment therebetween. Thus, the obvious advantages of hermaphroditic structures such as economy of fabricating material, apparatus, and labor are utilized in the container 7. Moreover, the half-sections 17 and 19 are readily removable by mere disengagement of the male and female portions 21 and 23, respectively.

The shape of the half-sections 17 and 19 may be any one of a number of well-known shapes and is primarily dependent upon the configuration provided by a stack of individual cells 5. For example, the half-sections 17 and 19 may be substantially semicircular shaped when a stack of individual cells 5 having a circular form are to be contained. When a stack of substantially rectangular-shaped cells 5 is to be contained and compressively restrained, the half-sections 17 and 19 are preferably substantially U-shaped with a flat portion 33 positioned intermediate a pair of upstanding portions 35 and 37. Such a configuration, it has been found, provides not only the desired compactness and resistance to deformation but also has rigidity sufficient to permit the exertion of a compressive force on a plurality of individual cells 5 disposed therebetween.

Also, the shape, size, location, and number of male and female portions 21 and 23 is dependent upon a number of factors including the materials utilized for the half-sections 17 and 19, the pressure exerted thereon by the cells 5, and the size of the container 7. For example, a T-shaped extension and slot is a preferred form for the male and female portions 21 and 23 because of the ease with which such forms may be fabricated and the excellent interlocking engagement obtainable therebetween. However, interlocking engagement jointure forms such as semicircular, dovetails, and numerous others are also applicable and appropriate forms for the male and female portions 21 and 23.

Further, the size and location of the male and female portions 21 and 23 must be such that the tensile and shear strength as well as the resistance to deformation thereof is sufficient to maintain a compressive force on the cells 5 disposed intermediate the half-sections 17 and 19. Moreover, the male and female portions 21 and 23 must either have or be affixed to each other to have an area of engagement therebetween which is maintained upon the application of pressure therebetween. In other words, the male and female portions 21 and 23 must have an area of engagement therebetween sufficient to prevent disengagement by slippage upon the application of pressure therebetween.

Thus, the material utilized for the half-sections 17 and 19 and obviously for the male and female portions 21 and 23 of the container 7 should be workable to permit fabrication of the desired form without undue cost and at the same time, have sufficient rigidity to permit the exertion of a compressive force on a plurality of cells 5. The material should also add a minimum of weight and volume to the battery 3 consistent with the above-mentioned required strength and rigidity. Further, the material should have a thickness sufficient to provide the previously mentioned area of engagement between the male and female portions 21 and 23.

Since the shape and size of the half-sections 17 and 19 as well as the shape, size, number, and location of the male and female portions 21 and 23 are dependent upon the individual cells 5 and the ultimate use of the battery 3, almost all metals and plastics are applicable and appropriate materials for the container 7. Moreover, metals such as ordinary tempered steel and aluminum have been found especially applicable when it is desired to compressively contain a plurality of sealed cells 5.

As to the assembly of the battery 3, a plurality of electrically insulated individual cells 5 are stacked and the half-sections 17 and 19 are placed therearound and force is applied thereto in an amount sufficient to cause the male portions 21 to move into interlocking engagement with the female portions 23. Thus, there is provided a substantially rectangular-shaped open-ended container 7 surrounding and compressively holding a plurality of individual cells 5. Thereafter, the electrodes of the individual cells 5 are electrically connected to provide a pair of terminals 11 and 13 for the battery 3.

Associated with the container 7 is one or more electrically nonconductive resilient layers 27. Preferably, the layer 27 is substantially rectangular-shaped and affixed to the flat portion 33 of the half-sections 17 and 19 by any one of a number of well-known methods. For example, the layer 27 may consist of a relatively thin layer of sponge-like material with an adhesive backing. Thus, utilization of a resilient layer 27 allows the half-sections to be manufactured within normal dimensional tolerances while permitting the application of a compressive force to a stack of individual cells 5 upon engagement of the male and female portions 21 and 23 in an interlocking relationship.

Also associated with the container 7 is a pair of end members 29 and 31. These end members 29 and 31 are of an electrically nonconductive material such as a plastic or the well-known product of the condensation of phenol with formaldehyde and known in the trade as "Bakelite." Moreover, each of the end members 29 and 31 is a substantially rigid structure and has a configuration adapted to cooperate with the particular configuration of the open-ended container 7.

Preferably, the end members 29 and 31 are substantially rectangular-shaped and include a plurality of slots 39 and one or more terminal means 41. The slots 41 are dimensionally and positionally adapted to cooperate with the tongue portions 25 of the container 7. Thus, a portion of each of the end members 29 and 31 is inserted within the container 7, and the tongue portions 25 are deformed in a manner such that the end members 29 and 31 are fixedly attached to the container 7.

Either or both of the end members 29 and 31 includes one or more terminal means 41 which may be in the form of apertures, terminals, snap buttons, tapered plugs or numerous other well-known means for providing electrical connection to a battery. These terminal means either include electrical conducting means molded therein or means for passage of electrical conductors therethrough.

Thus, there has been provided an improved battery container for a plurality of individual cells which is not only unique but also has numerous advantages over any of the known battery cell containers. For example, the container is economical to fabricate, adapted to an automated process, and provides a compact and neat appearing package for individual cells. The container is especially suited to rapid assembly of the individual cells into a battery at a minimum of expense and with a minimum of skill and training. More importantly, the design provides not only a surrounding structure for the individual cells but also exerts and maintains a compressive force thereon. Further, the container is sufficiently rigid to restrain the individual cells therein and prevent the deleterious effects of distortion thereof due to increased gas pressures within the cells. Also, means have been provided which allow the container to be manufactured to convenient dimensional tolerances. Moreover, terminal means have been provided for convenient external electrical connection to a battery.

While there has been shown and described what is at present considered to be the preferred embodiment of the invention, it will be obvious to those skilled in the art that various changes and modifications may be made therein without departing from the invention as defined in the appended claims.

What is claimed is:

1. A container for a plurality of battery cells comprising:

a pair of half-sections having male and female portions, said helf-sections being joined by at least one interlockingly engaged male and female portion to provide an open-ended enclosure surrounding and compressively holding a plurality of electrically insulated battery cells, said enclosure having a longitudinal axis extending in the direction of the open-ends thereof and exerting a compressive force on said cells in a direction substantially normal to said longitudinal axis.

2. A container for a plurality of electrically insulated battery cells comprising:

a pair of hermaphroditic half-sections joined by interlockingly engaged male and female portions to provide an open-ended enclosure surrounding and compressively holding a plurality of electrically insulated battery cells, said enclosure having a longitudinal axis extending in the direction of the open-ends there of and exerting a compressive force on said cells in a direction substantially normal to said longitudinal axis.

3. A container for a plurality of electrically insulated battery cells comprising:

a pair of substantially U-shaped half-sections with each half-section having a plurality of male and female portions, said male portions of each half-section being joined in interlocking engagement with the female portions of the other half-section to form a substantially rectangular-shaped open-ended enclosure surrounding and compressively holding a plurality of electrically insulated battery cells, said enclosure having a longitudinal axis extending in the direction of the open-ends thereof and exerting a compressive force on said cells in a direction substantially normal to said longitudinal axis.

4. A container for a plurality of electrically insulated battery cells comprising:

a pair of substantially U-shaped hermaphroditic half-sections having male and female portions with the male portion of each half-section in interlocking engagement with the female portion of the other half-section to form an open-ended substantially rectangular-shaped enclosure surrounding and compressively holding a plurality of electrically insulated battery cells, said enclosure having a longitudinal axis extending in the direction of the open-ends thereof and exerting a compressive force on said cells in a direction substantially normal to said longitudinal axis.

5. A container for a plurality of electrically insulated battery cells comprising:

a pair of substantially U-shaped hermaphroditic half-sections with each half-section having at least one male and one female portion and a plurality of tongue portions, said male portion of each half-section being joined in interlocking engagement with a female portion of the other half-section to provide an open-ended substantially rectangular-shaped enclosure surrounding and compressively holding a plurality of electrically insulated battery cells, and a pair of substantially similar rectangular-shaped end members of electrically nonconductive material having a plurality of slots therein, each of said end members being affixed within an opposing end of said enclosure by engagement of said tongue portions and said slots, and at least one of said end members having electrical terminating means passing therethrough.

6. A container for a plurality of electrically insulated battery cells comprising:

a pair of substantially U-shaped hermaphroditic half-sections, each half-section including a flat portion intermediate a pair of upstanding side portions having at least one male and female portion and a plurality of deformable tongue portions, and a substantially rectangular-shaped layer of resilient electrical nonconductive material affixed to and substantially covering the inner surface of the flat portion of at least one half-section, said half-sections being joined by interlocking engagement of the male portion of each half-section with the female portion of the other half-section to form a substantially rectangular-shaped open-ended enclosure, said enclosure including said layers of resilient electrically nonconductive material and surrounding and compressively holding a plurality of electrically insulated battery cells, and a pair of substantially rectangular-shaped end members of electrically nonconductive material having a plurality of slots therein, each of said end members being affixed within an opposing end of said open-ended enclosure by engagament of said slots and tongue portions, and at least one of said end members having terminal means for electrical connection therethrough.

References Cited by the Examiner

UNITED STATES PATENTS 777,457 12/1904 Wappler et al. _____ 136—173.1
3,147,151 9/1964 Toce _____ 136—166

FOREIGN PATENTS 193,450 11/1957 Austria.

WINSTON A. DOUGLAS, *Primary Examiner.*

ALLEN B. CURTIS, *Examiner*

D. L. WALTON, *Assistant Examiner.*